June 28, 1966 A. GABOR 3,258,754

BLOCK MARKERS

Filed Nov. 3, 1961

INVENTOR
ANDREW GABOR
BY
Douglas M. Clarkson
ATTORNEY 3,258,754
BLOCK MARKERS

Andrew Gabor, Port Washington, N.Y., assignor to Potter Instrument Company, Inc., Plainview, N.Y., a corporation of New York Filed Nov. 3, 1961, Ser. No. 149,996
2 Claims. (Cl. 340—174.1)

This invention, generally, relates to systems for marking blocks of information in recording media, and more particularly, to a new and improved method of marking blocks of information in digital magnetic recording media.

Quite frequently it is required to re-record one block of information or a group of isolated blocks when changing the contents of a magnetic recording medium. The problem encountered in such re-recording is that the new block of information must be positioned in the space available with a high degree of accuracy to avoid interference with adjacent blocks.

Heretofore there have been two basic methods to handle the task of re-recording selected blocks. One method was to re-record the entire balance of the tape following the block to be changed, and another method was to re-record single blocks by using block markers.

In the latter case, the block markers are used to indicate the position of the beginning of an information block. If the beginning of a new block of information is lined up with the block marker, the positioning accuracy of the new block usually is achieved.

However, the block marker methods used in the past are limited to the use of fixed block lengths. Accordingly, it is a principal object of this invention to provide a method whereby variable length blocks can be re-written in single isolated blocks.

It is also an object of the invention to provide a new and improved method of marking the boundaries of information blocks.

Briefly, a method in accordance with the principles of the present invention includes the steps of providing at least one information track on a recording medium. The medium is marked at the beginning of recording information, the mark being a suitable indicia adapted to develop a predetermined magnetic character. The recording medium is marked also at the end of the information block with another indicia, this second indicia being adapted to develop a magnetic characteristic different from the first.

Another object of the invention will be pointed out in the following description and claims and illustrated in the accompanying drawings which disclose, by way of example, the principle of the invention and the best mode which has been contemplated by applying that principle.

Figure 1:
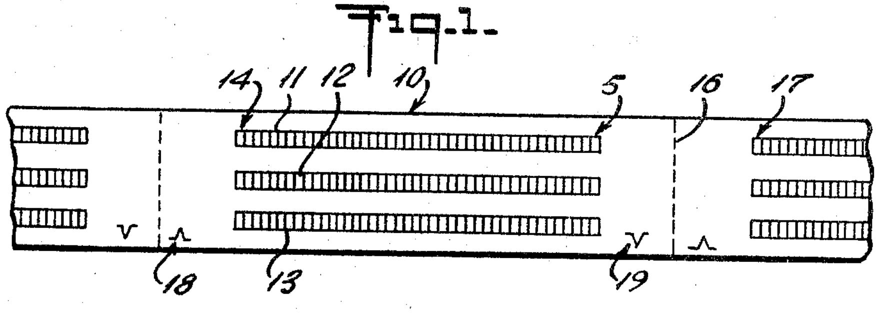
FIGURE 1 is a plane fragmentary view of a magnetic tape enlarged greatly.

Referring now to FIGURE 1 of the drawings, the numeral 10 identifies generally a suitable magnetizable medium such as a tape. A plurality of information tracks 11, 12 and 13 are shown to begin at one end 14 and terminate at another end 15.

Therefore, the information which is recorder between the ends 14 and 15 is recognized as one "block" of information, as is well known in the art. When recording the information within the blocks 14–15 and the end 15 is reached, the dotted line 16 indicates the position which the recording head comes to rest.

When starting the recording of a block, by the time the mechanism comes up to speed, the recording head has reached the point 17 for beginning the next information block. Accordingly, the interblock space is represented by the distance between the points 15 and 17, and the minimum space 15–17 is set by the mechanical characteristics of the machine.

In accordance with the invention, a magnetic impulse having a predetermined sense or "polarity" is read in at a point indicated by the numeral 18, and a second magnetic impulse is read in at a point 19 at the termination of the information blocks 14–15. The second impulse at the point 19 has an opposite "polarity" from the impulse read in at point 18.

It should be noted that no more than one track is needed for the block markers at points 18 and 19, and in a preferred form of the invention, a separate block marker track is provided.

Figure 2:
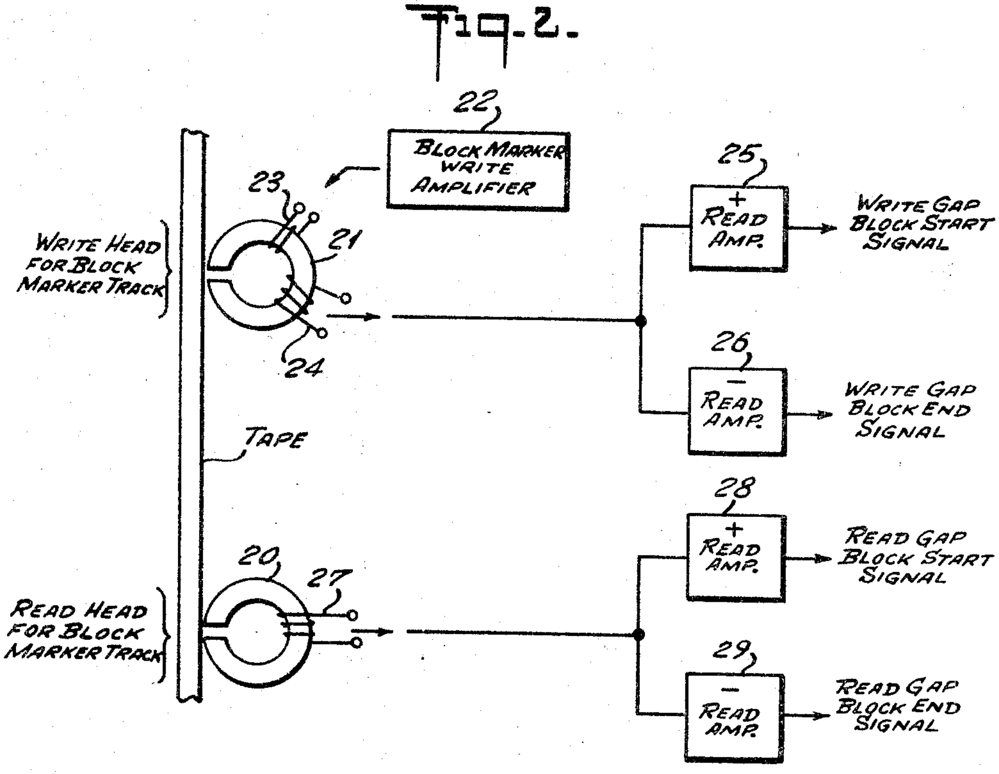
FIGURE 2 is a block diagram illustrating a circuit in accordance with the invention.

FIGURE 2 of the drawings indicates an electrical circuit for use in accordance with the principles of the invention. While the READ head 20 and the WRITE head 21 are illustrated separtely, they may be, of course, parts of a dual READ-WRITE head. However, the heads 20–21 shown in FIGURE 2 are primarily to cover the block marker track only.

A block marker "write" amplifier 22 is connected to a winding 23 which, in turn, is coupled magnetically with the write head 21 for applying the marks to the tape with the appropriate polarity.

A second coil 24 is positioned in magnetic coupling relationship with the "write" head 21 for use when it is desired to read the beginning block marker 18 of a previously written block, and this winding 24 is connected to polarity-sensitive read amplifiers 25 and 26. Since a "write" head normally is in advance of a "read" head, the read coil 24 accurately detects the position to start rewriting.

The "read" head 20 is provided with a winding 27 coupled magnetically therewith to detect block markers when the tape is being run in a forward direction, and the winding 27 is connected with polarity-sensitive amplifiers 28 and 29.

It should be noted that if the tape is being run backwards, the marker at the point 19 will appear as a positive pulse and the marker at the point 18 will be read as negative. Therefore, the block marker system in accordance with the invention is accurate regardless of the direction of tape movement.

A further advantage of the invention is that the use of block markers at both the beginning and end of each information block makes it possible to keep the playback amplifiers inhibited at all times except during the actual reading of information. This, in turn, permits the reduction of the threshold level to a much lower value than otherwise possible without the danger of spurious noise signals.

While the invention has been described with one particular application in mind, it should be understood that the scope of the present invention should be limited only by the appended claims.

I claim:

1. In an information storage and retrieval system, a magnetic storage medium, first means including a transducer for recording a magnetized region of one characteristic on each medium at the beginning of an information block and a magnetized region of a different characteristic at the end of an information block, and second means coupled to said transducer for detecting the magnetized regions marking the beginning of a previously written block of information, whereby the position of the beginning of a block is determined accurately when rewriting the same block.

2. In an information storage and retrieval system, a magnetic storage medium, transducer means including a core of magnetizable material and a winding coupled magnetically with the core for writing information on the storage medium in one track, first means coupled to the winding to record a block marker of one characteristic at the beginning of an information block and to record a block marker of different characteristic at the termination of said information block, and second means coupled to the transducer means for detecting the block marker of a previously written block of information, whereby the position of the beginning of a block is determined accurately when rewriting the same block.

References Cited by the Examiner

UNITED STATES PATENTS

| | | | |
|---|---|---|---|
| 2,782,398 | 2/1957 | West et al. | 340—174.1 |
| 3,016,522 | 1/1962 | Lourie et al. | 340—174.1 |
| 3,039,084 | 6/1962 | Curtis | 340—174.1 |
| 3,047,868 | 7/1962 | Schrimpf | 340—174.1 |
| 3,088,101 | 4/1963 | Schrimpf | 340—174.1 |

JAMES W. MOFFITT, *Acting Primary Examiner.*

IRVING L. SRAGOW, *Examiner.*

R. JENNINGS, P. F. ROTH, *Assistant Examiners.*